(12) United States Patent
Namikawa et al.

(10) Patent No.: US 11,131,799 B2
(45) Date of Patent: Sep. 28, 2021

(54) BACKLIGHT UNIT AND LIQUID CRYSTAL DISPLAY DEVICE

(71) Applicant: KEIWA Inc., Tokyo (JP)

(72) Inventors: Yoshitada Namikawa, Tokyo (JP); Yuki Matsuno, Tokyo (JP)

(73) Assignee: Keiwa Inc., Tokyo (JP)

( * ) Notice: Subject to any disclaimer, the term of this patent is extended or adjusted under 35 U.S.C. 154(b) by 0 days.

(21) Appl. No.: 16/957,277

(22) PCT Filed: Nov. 8, 2018

(86) PCT No.: PCT/JP2018/041552
§ 371 (c)(1),
(2) Date: Jun. 23, 2020

(87) PCT Pub. No.: WO2019/130850
PCT Pub. Date: Jul. 4, 2019

(65) Prior Publication Data
US 2021/0003767 A1      Jan. 7, 2021

(30) Foreign Application Priority Data
Dec. 28, 2017 (JP) .............................. JP2017-254582

(51) Int. Cl.
  *F21V 8/00*      (2006.01)
  *G02F 1/1335*   (2006.01)
(52) U.S. Cl.
  CPC ......... *G02B 6/0051* (2013.01); *G02B 6/0053* (2013.01); *G02B 6/0055* (2013.01); *G02F 1/133528* (2013.01); *G02B 6/0073* (2013.01)

(58) Field of Classification Search
None
See application file for complete search history.

(56) References Cited

U.S. PATENT DOCUMENTS

2007/0128376 A1* 6/2007 Harada ................ D06N 3/0063
                                                      428/1.1
2007/0189024 A1* 8/2007 Nanbu .............. G02F 1/133602
                                                      362/458
2007/0211496 A1* 9/2007 Ito ........................ G02B 6/0088
                                                      362/633
(Continued)

FOREIGN PATENT DOCUMENTS

JP       2014-130234 A     7/2014
JP       2016-028272 A     2/2016
(Continued)

*Primary Examiner* — Britt D Hanley
(74) *Attorney, Agent, or Firm* — Knobbe, Martens, Olson & Bear, LLP

(57) ABSTRACT

A backlight unit (5) includes a light guide sheet (21) and a light diffusion sheet (23) provided on the surface of the light guide sheet (21). Assuming that the coefficient of static friction between the light guide sheet (21) and the light diffusion sheet (23) measured at a temperature of 23° C. and a humidity of 50% in accordance with JIS K 7125 is $Y_1$, and the difference in coefficient of linear expansion between the light guide sheet (21) and the light diffusion sheet (23) measured in accordance with JIS K 7197 is X, the following relational expression (1) is satisfied.

[Math. 1]

$$Y_1 \leq 1.00 \times 10^{-4} X^2 - 3.43 \times 10^{-2} X + 2.35 \qquad (1).$$

6 Claims, 3 Drawing Sheets

(56) References Cited

U.S. PATENT DOCUMENTS

| | | | |
|---|---|---|---|
| 2014/0078458 A1* | 3/2014 | Fukushima | H01L 27/1218 349/158 |
| 2016/0011339 A1 | 1/2016 | Namikawa | |
| 2017/0227705 A1* | 8/2017 | Araki | G02B 6/0051 |
| 2017/0285246 A1* | 10/2017 | Teragawa | G02B 6/0043 |
| 2018/0003885 A1 | 1/2018 | Suzuki et al. | |
| 2019/0204678 A1* | 7/2019 | Hosoki | G02B 6/0056 |
| 2020/0174314 A1* | 6/2020 | Morino | G02B 1/14 |

FOREIGN PATENT DOCUMENTS

| | | |
|---|---|---|
| JP | 2016-095380 A | 5/2016 |
| WO | 2016/181812 A1 | 11/2016 |

\* cited by examiner

BACKLIGHT UNIT AND LIQUID CRYSTAL DISPLAY DEVICE

CROSS-REFERENCE TO RELATED APPLICATIONS

This application is the U.S. National Phase under 35. U.S.C. § 371 of International Application PCT/JP2018/041552, filed Nov. 8, 2018, which claims priority to Japanese Patent Application No. 2017-254582, filed Dec. 28, 2017. The disclosures of the above-described applications are hereby incorporated by reference in their entirety.

TECHNICAL FIELD

The present invention relates to a backlight unit for a liquid crystal display device and a liquid crystal display device.

BACKGROUND ART

In recent years, flat displays such as liquid crystal displays and plasma displays have been widely used as display devices because of their space saving designs and high definition. Among these, liquid crystal displays are drawing attention because of their enhanced power-saving designs and higher definition. Development of liquid crystal displays is thus being progressed.

This liquid crystal display device is a non-light emitting display device including, for example, a liquid crystal display panel and a backlight. The liquid crystal display panel includes a thin film transistor (hereinafter referred to as "TFT") substrate, a color filter (hereinafter referred to as "CF") substrate, and a liquid crystal layer. The TFT substrate faces the CF substrate. The liquid crystal layer is enclosed between the TFT substrate and the CF substrate. The backlight is disposed on the back side of the liquid crystal display panel. In the CF substrate, for example, layers colored in red, green, or blue are provided for sub-pixels that form pixels.

As the backlight, a backlight unit of an edge light (side light) type or a direct type is mounted on the lower surface of the liquid crystal layer. As the edge light type backlight unit, disclosed is, for example, a backlight unit including a light source, a rectangular plate-like light guide sheet disposed with its edge being along the light source, a light diffusion sheet disposed on the front surface of the light guide sheet and mainly having a light diffusing function, and a prism sheet provided on the front surface of the light diffusion sheet and having a reflection function toward the normal direction (for example, see PATENT DOCUMENT 1).

CITATION LIST

Patent Document

PATENT DOCUMENT 1: Japanese Unexamined Patent Publication No. 2016-95380

SUMMARY OF THE INVENTION

Technical Problem

For the conventional backlight unit, the following problem arises. Since an expansion/contraction amount of the light diffusion sheet differs from that of the light guide sheet, friction between the light diffusion sheet and the light guide sheet occurs due to the expansion/contraction of the light guide sheet having a larger expansion/contraction amount. This friction causes deformation (a wrinkle) due to warpage of the light diffusion sheet having a smaller expansion/contraction amount.

More specifically, the main component of the base layer in the light diffusion sheet is, for example, polyethylene terephthalate (PET) resin, whereas the main component of the light guide sheet is, for example, polycarbonate (PC) resin or an acrylic resin, which has a higher coefficient of linear expansion than the polyethylene terephthalate resin. Accordingly, the following problem arises. The expansion/contraction amount of the light diffusion sheet differs from that of the light guide sheet when heated or cooled, and the light diffusion sheet is deformed (wrinkled) by the expansion/contraction of the light guide sheet having a larger expansion/contraction amount.

In view of the forgoing background, it is therefore an object of the present invention to provide a backlight unit capable of reducing deformation due to warpage of the light diffusion sheet.

Solution to the Problem

In order to achieve the aforementioned object, the backlight unit of the present invention includes an optical element and a light diffusion sheet provided on the surface of the optical element, and assuming that the coefficient of static friction between the optical element and the light diffusion sheet measured at a temperature of 23° C. and a humidity of 50% in accordance with JIS K 7125 is $Y_1$, and the difference in coefficient of linear expansion between the optical element and the light diffusion sheet measured in accordance with JIS K 7197 is X, the following relational expression (1) is satisfied.

[Math. 1]

$$Y_1 \leq 1.00 \times 10^{-4} X^2 - 3.43 \times 10^{-2} X + 2.35 \quad (1)$$

Another backlight unit of the present invention includes an optical element and a light diffusion sheet provided on the surface of the optical element, and assuming that the coefficient of static friction between the optical element and the light diffusion sheet measured at a temperature of 65° C. and a humidity of 95% in accordance with JIS K 7125 is $Y_2$, and the difference in coefficient of linear expansion between the optical element and the light diffusion sheet measured in accordance with JIS K 7197 is X, the following relational expression (2) is satisfied.

[Math. 2]

$$Y_2 \leq 9.00 \times 10^{-5} X^2 - 3.51 \times 10^{-2} X + 3.12 \quad (2)$$

Advantages of the Invention

The present invention can reduce deformation due to warpage of a light diffusion sheet due to expansion/contraction of an optical element, for example, a light guide sheet, disposed to face the light diffusion sheet.

DESCRIPTION OF EMBODIMENT

Embodiments of the present disclosure will be described in detail with reference to the drawings.

Figure 1:
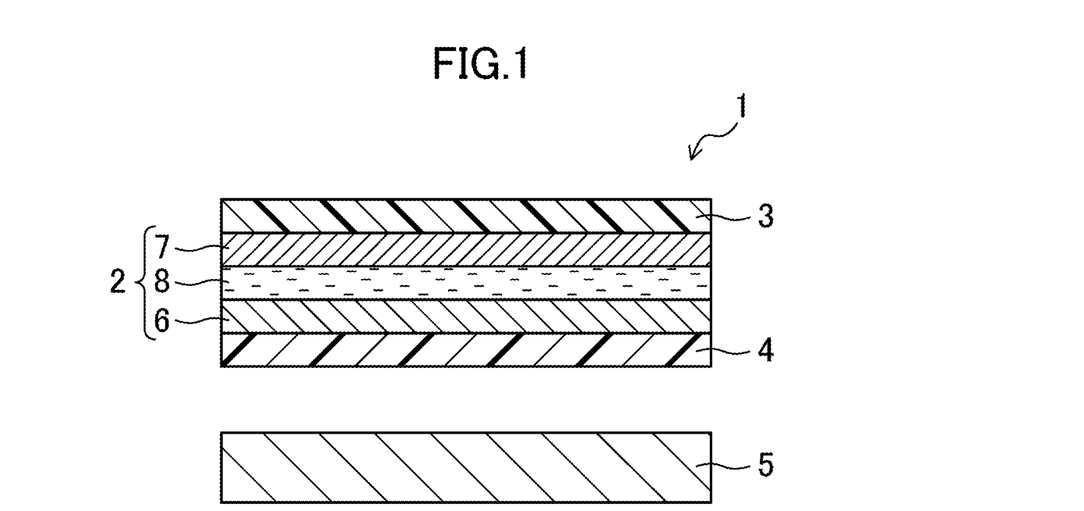
FIG. 1 is a cross-sectional view of a liquid crystal display device according to an embodiment of the present invention.
Figure 2:
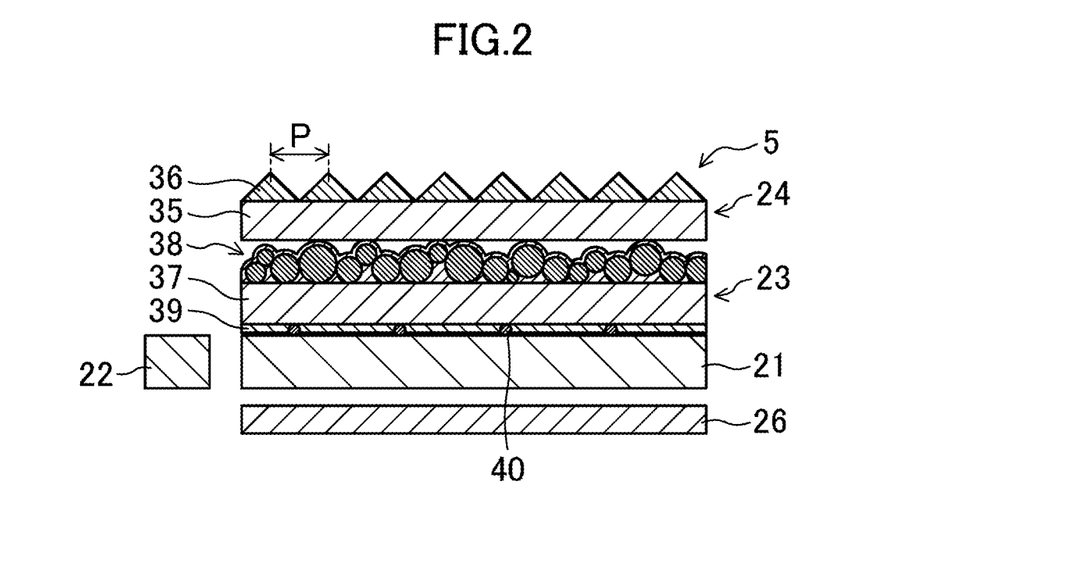
FIG. 2 is a cross-sectional view illustrating a backlight unit in the liquid crystal display device according to the embodiment of the present invention.

FIG. 1 is a cross-sectional view of a liquid crystal display device according to an embodiment of the present invention. FIG. 2 is a cross-sectional view illustrating a backlight unit in the liquid crystal display device according to the embodiment of the present invention.

As shown in FIG. 1, the liquid crystal display device 1 includes a liquid crystal display panel 2 including a plurality of pixels arranged in a matrix, a first polarizing plate 3 attached to the front surface of the liquid crystal display panel 2 (i.e., the upper side in FIG. 1 and the viewer-side of the liquid crystal display device 1) (hereinafter also merely referred to as "polarizing plate 3"), a second polarizing plate 4 attached to the back (i.e., rear) side of the liquid crystal display panel 2 (i.e., the lower side in FIG. 1 and the non-viewer-side of the liquid crystal display device 1) (hereinafter also merely referred to as "polarizing plate 4"), and a backlight unit 5 provided on the back side of the liquid crystal display panel 2.

As shown in FIG. 1, the liquid crystal display panel 2 includes a TFT substrate 6 as a first substrate, a CF substrate 7 as a second substrate disposed to face the TFT substrate, a liquid crystal layer 8 provided between the TFT substrate 6 and the CF substrate 7, a sealing member (not shown) provided in a frame shape to bring the TFT substrate 6 and the CF substrate 7 to adhere to each other and enclose the liquid crystal layer 8 between the TFT substrate 6 and the CF substrate 7.

Each of the TFT substrate 6 and the CF substrate 7 is in the shape of a rectangular plate. The liquid crystal display device 1 includes a plurality of photo spacers (not shown) for regulating the thickness of the liquid crystal layer 8 (i.e., the gap between cells).

The TFT substrate 6 includes, though not shown, for example, an insulating substrate such as a glass substrate or a plastic substrate, a plurality of gate lines provided to extend parallel to each other on the insulating substrate, a plurality of source lines provided to extend parallel to each other, perpendicularly to the gate lines, a plurality of TFTs each of which is provided at one of the intersections between the gate lines and the source lines, that is, for a sub-pixel Pr, Pg, or Pb, a protective film provided to cover the TFTs, a plurality of pixel electrodes arranged in a matrix on the protective film and connected to the TFTs, and an alignment film provided to cover the pixel electrodes.

The CF substrate 7 includes an insulating substrate such as a glass substrate or a plastic substrate, a common electrode (not shown) provided on the insulating substrate, and an alignment film (not shown) provided to cover the common electrode.

The liquid crystal layer 8 is made of, for example, a nematic liquid crystal material having electrooptic properties.

<Backlight Unit>

As shown in FIG. 2, the backlight unit 5 is an edge light type backlight unit. This backlight unit 5 includes a light guide sheet 21 that guides light beams entering from an end face to the front surface, a light source 22 that projects light beams toward the end face of the light guide sheet 21, a light diffusion sheet 23 superimposed on the front surface of the light guide sheet 21, and a prism sheet 24 disposed on the front surface of the light diffusion sheet 23. The backlight unit 5 further includes a reflection sheet 26 disposed on the back side of the light guide sheet 21.

The light diffusion sheet 23 functions to diffuse light beams entering from the back side and to collect (collect and diffuse) the light beams in the normal direction. The prism sheet 24 functions to refract the light beams entering from the back side toward the normal direction. Further, the reflection sheet 26 functions to reflect the light beams emitted from the back side of the light guide sheet 21 toward the front surface and to bring the light beams to enter the light guide sheet 21 again.

<Prism Sheet>

The prism sheet 24 is disposed to face a polarizing plate 4. The prism sheet 24 needs to transmit light beams. The main component of the prism sheets 24 is thus a colorless and transparent synthetic resin. The prism sheet 24 includes a base layer 35 and an array of a plurality of prism projections 36 stacked on the surface of the base layer 35. The prism projections 36 are stacked in a stripe pattern on the surface of the base layer 35. The prism projections 36 are triangular prisms having the respective back surfaces which are in contact with the surface the base layer 35.

The lower limit of the thickness of the prism sheet 24 (the height from the back surface of the base layer 35 to the vertices of the prism projections 36) is preferably 35 μm, more preferably 50 μm. On the other hand, the upper limit of the thickness of the prism sheet 24 is preferably 200 μm, more preferably 180 μm.

The lower limit of the pitch P (see FIG. 2) of the prism projections 36 of the prism sheet 24 is preferably 12 μm, more preferably 20 μm. On the other hand, the upper limit of the pitch P of the prism projections 36 of the prism sheet 24 is preferably 100 μm, more preferably 60 μm.

The vertex angles of the prism projections 36 preferably fall within a range from 85° to 95°. The lower limit of the refractive index of each of the prism projections 36 is preferably 1.5, more preferably 1.55. On the other hand, the upper limit of the refractive index of each of the prism projections 36 is preferably 1.7.

As the prism sheet 24, a prism sheet formed of two prism sheets may be used, or a single prism sheet obtained by bonding two prism sheets may be used.

<Light Diffusion Sheet>

The light diffusion sheet 23 is provided on the surface of the light guide sheet 21, and includes a base layer 37, a light diffusion layer 38 disposed on the front surface side of the base layer 37, and an anti-sticking layer 39 disposed on the back side of the base layer 37.

The base layer 37 of the light diffusion sheet 23 needs to transmit light beams. The main component of the base layer 37 is thus a colorless and transparent synthetic resin. The main component of the base layer 37 is not particularly limited, and examples thereof include polyethylene terephthalate, polyethylene naphthalate, acrylic resins, polycarbonate, polystyrene, polyolefin, cellulose acetate, weather-resistant vinyl chloride, and polyimide.

The light diffusion layer 38 of the light diffusion sheet 23 includes a light diffusion material and a binder therefor. The light diffusion material is made of particles having a property of diffusing light beams, and the particles are broadly divided into an inorganic filler and an organic filler. Examples of the inorganic filler include silica, aluminum hydroxide, aluminum oxide, zinc oxide, barium sulfide, magnesium silicate, and mixtures thereof. Specific examples of the material for the organic filler include acrylic resins, acrylonitrile resins, polyurethane, polyvinyl chloride, polystyrene, polyamide, and polyacrylonitrile.

The shape of the light diffusion material is not particularly limited, and examples thereof include a sphere, a cube, a needle, a rod, a spindle, a plate, a scale, and fibers. Among these, spherical beads with excellent light diffusibility are preferably used.

The anti-sticking layer 39 is formed by dispersing resin beads 40 in a resin matrix. These resin beads 40 are disposed sparsely on the back side of the base layer 37. The anti-sticking layer 39 includes these resin beads 40 disposed sparsely, thereby including a plurality of projections formed by the resin beads 40 and flat portions that include no resin beads 40. The anti-sticking layer 39 is in contact with the light guide sheet 21 disposed on the back side at the projections sparsely, i.e., is not in contact with the light guide sheet 21 at the entire back side, thereby substantially preventing sticking and reducing non-uniform luminance in the liquid crystal display device 1.

The resin for forming the anti-sticking layer 39 is not particularly limited, and examples thereof include acrylic urethane-based resins, acrylic resins, acrylonitrile resins, polyurethane, polyvinyl chloride, polystyrene, polyamide, and polyacrylonitrile.

Among them, acrylic urethane-based resins are suitably used to impart flexibility to the anti-sticking layer 39 from the viewpoint of reducing failures in luminous points due to damage to the surface of the light guide sheet 21 caused by the friction between the light diffusion sheet 23 and the light guide sheet 21. Herein, the acrylic urethane-based resin refers to the acrylic resin having an acrylic skeleton and an urethane skeleton, and for example, a resin obtained by crosslinking an isocyanate resin and an acrylic polyol resin may be used.

<Light Guide Sheet>

The light guide sheet 21 is a sheet-like optical element that emits, from the surface, light beams emitted from light source 22 while propagating the light beams to the inside. The light guide sheet 21 may be formed to have a substantially wedge-shaped cross-section, or may be formed in a substantially flat plate shape.

The light guide sheet 21 needs to have translucency. The main component of the light guide sheet 21 is thus particularly a colorless and transparent resin. The main component of the light guide sheet 21 is not particularly limited, and examples thereof include polycarbonate resins, which are excellent in, for example, transparency and strength, and synthetic resins such as acrylic resins, which are excellent in, for example, transparency and scratch resistance. Among these, as the main component of the light guide sheet 21, polycarbonate resins are suitable. Since the polycarbonate resins have excellent transparency and have high refractive indexes, total reflection is prone to occur at interfaces in air layers (a layer formed between the light guide layer 21 and a light diffusion sheet 23 disposed on the front surface of the light guide sheet 21 and a layer formed between the light guide layer 21 and a reflection sheet 26 disposed on the back side of the light guide sheet 21), and light beams can efficiently propagate. In addition, the polycarbonate resins have the heat resistance and are thus less prone to be deteriorated by heat generated in the light source 22.

<Light Source>

The light source 22 is disposed such that its projecting surface faces (or is brought into contact with) an end face of the light guide sheet 21. As the light source 22, various light sources can be used, and for example, light-emitting diodes (LEDs) can be used. More specifically, as the light source 22, a light source in which a plurality of light-emitting diodes are disposed along an end face of the light guide sheet 21 may be used.

<Reflection Sheet>

The reflection sheet 26 can be a white sheet obtained by dispersing fillers in a base resin such as polyester, and a mirror surface sheet having improved specular reflectivity by depositing a metal such as aluminum or silver on a surface of a film formed of, for example, polyester.

In the conventional backlight unit, as described above, there is a problem in that the light diffusion sheet having a smaller expansion/contraction amount is deformed by expansion/contraction of the light guide sheet with a larger expansion/contraction amount.

The inventors of the present invention have focused on this point, and found conditions for reducing deformation due to warpage of the light diffusion sheet 23 by reducing an influence of expansion/contraction of the light guide sheet 21 having a larger expansion/contraction amount through reducing the friction between the light diffusion sheet 23 and the light guide sheet 21.

More specifically, the backlight unit 5 of the present invention has the following feature: Assuming that the coefficient of static friction between the light guide sheet 21 and the light diffusion sheet 23 is $Y_1$, and the difference between the coefficient $\alpha_1$ of linear expansion of the light guide sheet 21 and the coefficient $\alpha_2$ of linear expansion of the light diffusion sheet 23 (i.e., $\alpha_1-\alpha_2$) is X, the following relational expression (3) is satisfied.

[Math. 3]

$$Y_1 \leq 1.00\times10^{-4}X^2 - 3.43\times10^{-2}X + 2.35 \tag{3}$$

The "coefficient $Y_1$ of static friction" in the relational expression (3) refers to one measured at a temperature of 23° C. and a humidity of 50% in accordance with JIS K 7125. In addition, the "coefficient of linear expansion" refers to one measured in accordance with JIS K 7197.

Deformation due to warpage of the light diffusion sheet 23 can be reduced by lowering a coefficient $Y_1$ of static friction between the light guide sheet 21 and the light diffusion sheet 23 and setting this coefficient $Y_1$ of static friction to be in a range satisfying the relational expression (3), even if the expansion/contraction amount of the light guide sheet 21 largely differs from that of the light diffusion sheet 23 (i.e., the difference between the coefficient $\alpha_1$ of linear expansion of the light guide sheet 21 and the coefficient $\alpha_2$ of linear expansion of the light diffusion sheet 23 is large).

In addition, if the liquid crystal display device 1 is used for a long period of time, the backlight unit 5 is exposed to high temperature and high humidity conditions for a long period of time. The inventors of the present invention have also focused on this point, and also found conditions for reducing deformation due to warpage of the light diffusion sheet 23 under the high temperature and high humidity conditions (temperature: 65° C., humidity: 95%).

More specifically, the backlight unit 5 of the present invention has the following feature: Assuming that the coefficient of static friction between the light guide sheet 21 and the light diffusion sheet 23 is $Y_2$, and the difference between the coefficient $\alpha_1$ of linear expansion of the light guide sheet 21 and the coefficient $\alpha_2$ of linear expansion of the light diffusion sheet 23 (i.e., $\alpha_1-\alpha_2$) is X, the following relational expression (4) is satisfied.

[Math. 4]

$$Y_2 \leq 9.00 \times 10^{-5}X^2 - 3.51 \times 10^{-2}X + 3.12 \quad (4)$$

The "coefficient $Y_2$ of static friction" in the relational expression (4) refers to one measured at a temperature of 65° C. and a humidity of 95% in accordance with JIS K 7125.

Deformation due to warpage of the light diffusion sheet 23 can be reduced by lowering a coefficient $Y_2$ of static friction between the light guide sheet 21 and the light diffusion sheet 23 and setting this coefficient $Y_2$ of static friction to be in a range satisfying the relational expression (4), even if the expansion/contraction amount of the light guide sheet 21 largely differs from that of the light diffusion sheet 23 under the high temperature and high humidity conditions (temperature: 65° C., humidity 95%).

The coefficients $Y_1$ and $Y_2$ of static friction can be lowered by lowering the hardness of the resin for forming the anti-sticking layer 39 which is in contact with the light guide sheet 21.

More specifically, the load due to the weights of the light diffusion sheet 23, the prism sheet 24, and the liquid crystal display device 1 is applied to the contact portions between projections of the light diffusion sheet 23 and the light guide sheet 21. Thus, if the resin for forming the anti-sticking layer 39 has a low hardness, the projections of the light diffusion sheet 23 are deformed, thereby increasing contact areas between the projections of the light diffusion sheet 23 and the light guide sheet 21. As a result, the friction between the light diffusion sheet 23 and the light guide sheet 21 increases. Therefore, in the present embodiment, the hardness of the resin for forming the anti-sticking layer 39 that is brought to be in contact with the light guide sheet 21 is set to be high to reduce deformation due to warpage of the projections of the light diffusion sheet 23 and lower the coefficients $Y_1$ and $Y_2$ of static friction.

The "hardness" described herein refers to one measured in accordance with ISO 14577-1 (instrumented indentation test for hardness), which can be measured using a micro hardness tester (manufactured by SHIMAZU CORPORATION, trade name: DUH-W201).

Further, the reduction in average diameter of the projections formed in the anti-sticking layer 39 by the resin beads 40 reduces the contact areas between the anti-sticking layer 39 and the light guide sheet 21, thereby reducing the coefficients $Y_1$ and $Y_2$ of static friction.

The "average diameter of the projections" described herein refers to an average value of diameters of 10 projections extracted arbitrary.

In addition, in the present embodiment, a light guide sheet 21 formed of polycarbonate or an acrylic resin is described as an example of the optical element disposed to face the light diffusion sheet 23, but any optical element satisfying the above relational expressions (3) and (4) to reduce deformation due to warpage of the light diffusion sheet 23 may be used.

Examples of the optical element include glass sheets, metallic sheets such as an aluminum sheet, and resin sheets formed of, for example, a polyethylene terephthalate resin, a polyimide resin, a polyvinyl chloride (PVC) resin, an acrylonitrile-butadiene-styrene (ABS) resin, a polytetrafluoroethylene (PTFE) resin, and a polypropylene (PP) resin.

In the present embodiment, the anti-sticking layer 39 including resin beads 40 dispersed in a resin matrix is described as an example, but an anti-sticking layer 39 may be shaped, or a configuration of shaping the base layer 37 may be used, without using resin beads 40. The shape in this case is not particularly limited, and examples thereof include a sphere, a cube, a needle, a rod, a spindle, a plate, a scale, and fibers. With also such configurations, the relational expressions (3) and (4) are satisfied, thereby reducing deformation due to warpage of the light diffusion sheet 23.

EXAMPLES

The present invention will now be described on the basis of examples. The present invention is not limited to these examples, and various modifications and variations of these examples can be made without departing from the scope and spirit of the present disclosure.

Example 1

<Measurement of Coefficient of Linear Expansion>

A light diffusion sheet including an anti-sticking layer formed of an acrylic urethane-based resin (surface hardness: 0.67 mN) and having projections in the surface, and an optical sheet (optical element) formed of glass were provided. Then, the coefficients of linear expansion of the light diffusion sheet and the optical element were measured by the thermo mechanical analyzer method (TMA) (JIS L 7197).

More specifically, samples each having 10 mm×5 mm in the mechanical axis (longitudinal) direction (hereinafter referred to as the "MD direction") and the direction orthogonal thereto (hereinafter referred to as the "TD direction") were first provided. Then, the coefficients $\alpha_1$ of linear expansion of the optical sheet and the coefficients $\alpha_2$ of linear expansion of the light diffusion sheet in each sample were measured at temperatures from 30° C. to 70° C. while the temperature was increased from room temperature to 70° C. at 5° C./min in atmosphere using linear expansion coefficient measurement apparatus (manufactured by Hitachi High-Tech Science Corporation, trade name: TMA7100) with adjustment of a load to a probe (detection rod) for measuring the length to 4 [kPa].

The coefficients $\alpha_1$ and $\alpha_2$ of linear expansion were calculated on the basis of the following expression (5).

[Math. 5]

$$\text{Coefficient } \alpha_1 \text{ (or } \alpha_2\text{) of linear expansion} = (1/L_0) \times (L_{70}-L_{30})/(70-30) \quad (5)$$

Here, $L_0$ indicates the length [mm] of the sample (sheet), $L_{30}$ indicates the change amount [μm] of the length at 30° C., and $L_{70}$ indicates the change amount [μm] of the length at 70° C.

Then, the difference X (i.e., $\alpha_1-\alpha_2$) between the coefficients $\alpha_1$ and $\alpha_2$ of linear expansion was calculated. Table 1 shows the results.

<Measurement of Coefficient of Static Friction>

Next, the anti-sticking layer of the light diffusion sheet and the optical sheet were brought to be in contact with each other. Then, a coefficient $Y_1$ of static friction between the optical sheet and the light diffusion sheet was measured at a temperature of 23° C. and a humidity of 50% by the determination method of the coefficients of friction (JIS K 7125).

More specifically, an optical sheet (63 mm×63 mm) was first placed on a light diffusion sheet (200 mm×150 mm), and further, 200 g of a weight (63 mm×63 mm) was placed on the optical sheet. Subsequently, the optical sheet was stretched at 100 mm/min using a tensile tester (manufactured by A&D Inc., trade name: RGT-1210), and the coefficient $Y_1$ of static friction at the stretching was measured.

In addition, in the same manner, the coefficient $Y_2$ of static friction between the optical sheet and the light diffusion sheet was measured at a temperature of 65° C. and a humidity of 95% in accordance by the determination method of the coefficients of friction (JIS K 7125). Table 1 shows the results.

<Evaluation of Deformation Due to Warpage>

Next, the presence or absence of deformation due to warpage of the light diffusion sheet was evaluated. More specifically, on a 5-inch optical sheet, a light diffusion sheet having the same size was overlaid. Further, a prism sheet (formed of a prism sheet having a thickness of 75 μm and a prism sheet having a thickness of 100 μm overlaid on the prism sheet to be orthogonal to prism projections) was placed on the light diffusion sheet. Subsequently, in this state, the laminate was allowed to stand at a temperature of 65° C. and a humidity of 95% for 72 hours.

Thereafter, this laminate was returned to room temperature (temperature: 23° C., humidity: 50%) and taken out in this state, and after two hours, the presence or absence of deformation due to warpage of the light diffusion sheet was checked. The presence or absence of the deformation due to warpage was checked by placing the light diffusion sheet alone on a smooth glass plate and visually observing it from the side under a fluorescent lamp. Table 1 shows the results.

Examples 2 to 13 and Comparative Examples 1 to 11

The coefficient of linear expansion and the coefficient of static friction were measured, and deformation due to warpage was evaluated in the same manner as in Example 1 except that at least one of the hardness of the resin for forming the anti-sticking layer, the average diameter of the projections, or the material of the optical sheet was changed to that shown in Table 1. Table 1 shows the results.

TABLE 1

| | Light Diffusion Film | | | Optical Sheet | | Difference X | Coefficient $Y_1$ | Coefficient $Y_2$ | |
|---|---|---|---|---|---|---|---|---|---|
| | Hardness [mN] of Anti-Sticking Layer (Acrylic Urethane-based Resin) | Average Diameter [μm] of Projections | Coefficient $a_2$ of Linear Expansion [×10$^{-6}$/K] | Material | Coefficient $\alpha_1$ of Linear Expansion [×10$^{-6}$/K] | in Coefficient of Linear Expansion ($\alpha_1$-$\alpha_2$) | of Static Friction (temp.: 23° C., hum.: 50%) | of Static Friction (temp.: 65° C., hum.: 95%) | Deformation due to Warpage |
| Ex. 1 | 0.67 | 20 μm | 8.5 | Glass | 9.0 | 0.5 | 0.57 | 0.71 | None |
| Ex. 2 | 0.36 | 30 μm | 8.5 | Glass | 9.0 | 0.5 | 0.45 | 0.66 | None |
| Ex. 3 | 0.36 | 30 μm | 8.5 | PET | 15.0 | 6.5 | 2.13 | 2.89 | None |
| Ex. 4 | 0.67 | 10 μm | 8.5 | Aluminum | 24.0 | 15.5 | 1.42 | 1.95 | None |
| Ex. 5 | 0.67 | 20 μm | 8.5 | Aluminum | 24.0 | 15.5 | 1.63 | 2.16 | None |
| Ex. 6 | 0.67 | 20 μm | 8.5 | Polyimide | 54.0 | 45.5 | 0.92 | 1.33 | None |
| Ex. 7 | 0.67 | 20 μm | 8.5 | PVC | 61.0 | 52.5 | 0.80 | 1.49 | None |
| Ex. 8 | 0.67 | 20 μm | 8.5 | PC | 70.0 | 61.5 | 0.66 | 1.28 | None |
| Ex. 9 | 0.67 | 10 μm | 8.5 | Polymethylmethacrylate | 75.0 | 66.5 | 0.41 | 0.82 | None |
| Ex. 10 | 0.67 | 20 μm | 8.5 | Polymethylmethacrylate | 75.0 | 66.5 | 0.55 | 0.97 | None |
| Ex. 11 | 0.67 | 20 μm | 8.5 | ABS | 86.5 | 78.0 | 0.48 | 0.82 | None |
| Ex. 12 | 0.67 | 20 μm | 8.5 | PTFE | 98.5 | 90.0 | 0.31 | 0.44 | None |
| Ex. 13 | 0.67 | 20 μm | 8.5 | PP | 120.0 | 111.5 | 0.18 | 0.27 | None |
| Comp. Ex. 1 | 0.21 | 40 μm | 8.5 | PET | 15.0 | 6.5 | 3.35 | 3.95 | Deformed |
| Comp. Ex. 2 | 0.36 | 30 μm | 8.5 | Aluminum | 24.0 | 15.5 | 2.94 | 3.64 | Deformed |
| Comp. Ex. 3 | 0.36 | 30 μm | 8.5 | Polyimide | 54.0 | 45.5 | 1.92 | 2.64 | Deformed |
| Comp. Ex. 4 | 0.21 | 40 μm | 8.5 | Polyimide | 54.0 | 45.5 | 3.35 | 4.97 | Deformed |
| Comp. Ex. 5 | 0.36 | 30 μm | 8.5 | PVC | 61.0 | 52.5 | 1.59 | 2.16 | Deformed |
| Comp. Ex. 6 | 0.36 | 30 μm | 8.5 | PC | 70.0 | 61.5 | 1.89 | 2.35 | Deformed |
| Comp. Ex. 7 | 0.21 | 30 μm | 8.5 | PC | 70.0 | 61.5 | 3.05 | 3.72 | Deformed |
| Comp. Ex. 8 | 0.36 | 30 μm | 8.5 | Polymethylmethacrylate | 75.0 | 66.5 | 1.82 | 2.48 | Deformed |
| Comp. Ex. 9 | 0.36 | 30 μm | 8.5 | ABS | 86.5 | 78.0 | 1.58 | 1.95 | Deformed |
| Comp. Ex. 10 | 0.36 | 30 μm | 8.5 | PTFE | 98.5 | 90.0 | 0.76 | 0.88 | Deformed |
| Comp. Ex. 11 | 0.36 | 30 μm | 8.5 | PP | 120.0 | 111.5 | 0.67 | 0.71 | Deformed |

<Correlation Between Coefficient of Static Friction and Coefficient of Linear Expansion>

Next, the relationship between the coefficient $Y_1$ of static friction (temperature: 23° C., humidity: 50%) between the optical sheet and the light diffusion sheet and the difference X between the coefficient $\alpha_1$ of linear expansion of the optical sheet and the coefficient $\alpha_2$ of linear expansion of the light diffusion sheet, shown in Table 1 was plotted, and the relationship between the coefficient $Y_1$ of static friction and the difference X in coefficient of linear expansion and the presence or absence of deformation due to warpage were considered. The results are shown in FIG. 3.

Figure 4:
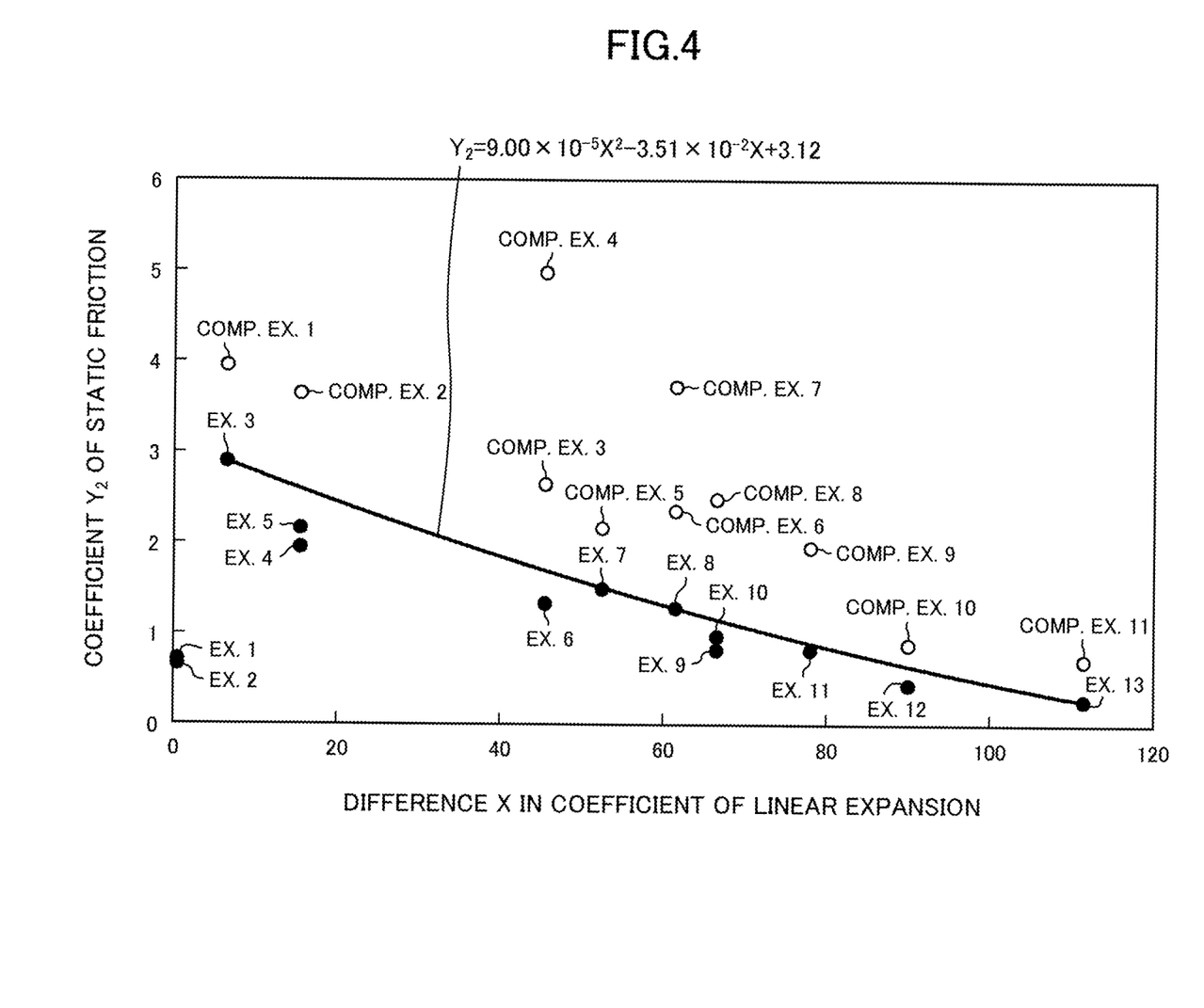
FIG. 4 is a drawing illustrating a relationship between the coefficient of static friction and the difference in coefficient of linear expansion under high temperature conditions (temperature: 65° C., humidity: 95%).

In the same manner, the relationship between the coefficient $Y_2$ of static friction (temperature: 65° C., humidity: 95%) between the optical sheet and the light diffusion sheet and the difference X between the coefficient al of linear expansion of the optical sheet and the coefficient $\alpha_2$ of linear expansion of the light diffusion sheet, shown in Table 1, was plotted, and the relationship between the coefficient $Y_2$ of static friction and the difference X in coefficient of linear expansion and the presence or absence of deformation due to warpage were considered. The results are shown in Table 4.

Figure 3:
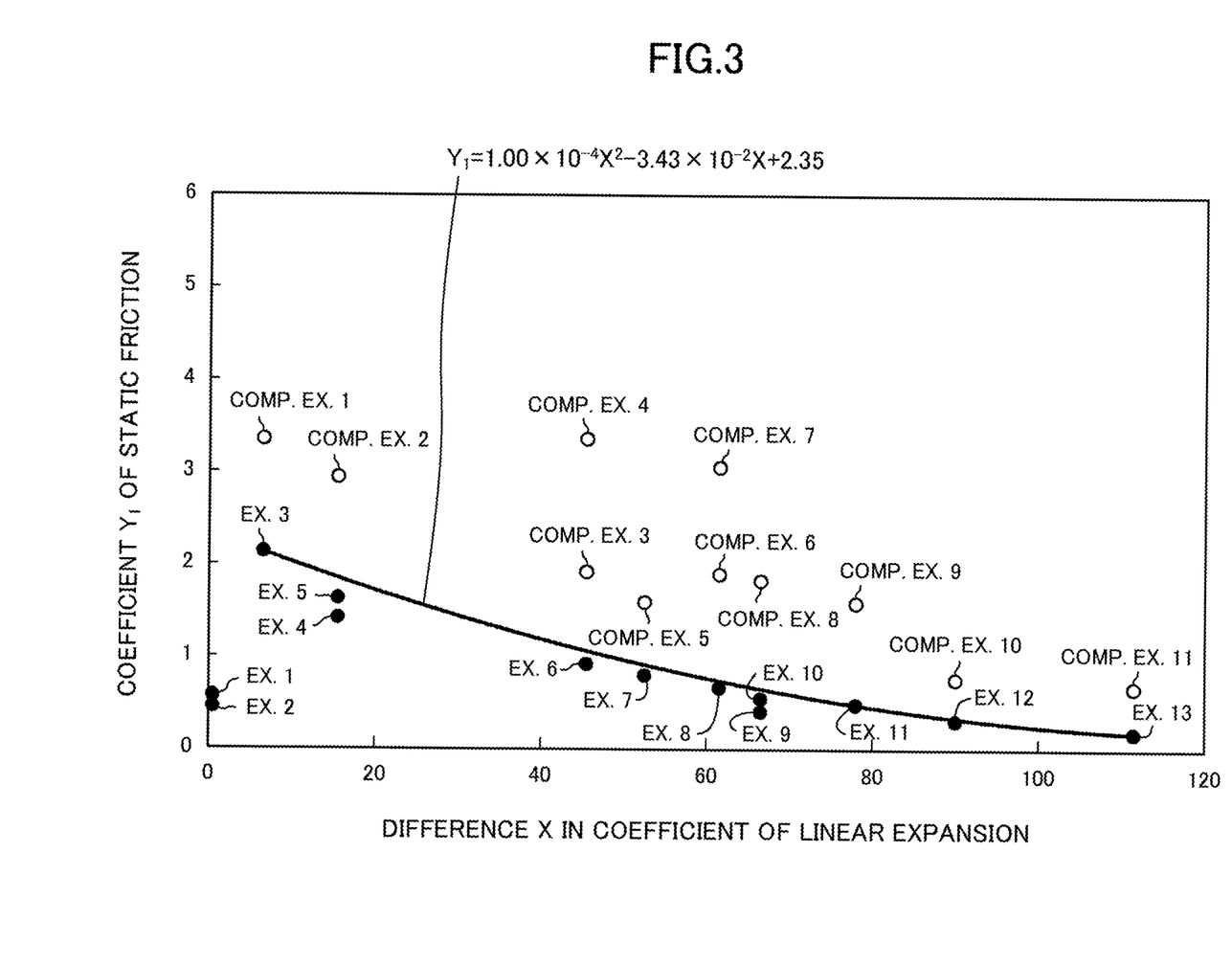
FIG. 3 is a drawing illustrating a relationship between the coefficient of static friction and the difference in coefficient of linear expansion under normal temperature conditions (temperature: 23° C., humidity: 50%).

As can be seen from Table 1 and FIG. 3, the deformation due to warpage of the light diffusion sheet is reduced in the case in which the coefficient $Y_1$ of static friction satisfies the relational expression (3) to the difference X in coefficient of linear expansion under normal temperature conditions (temperature: 23° C., humidity: 50%) (i.e., Examples 1 to 13).

Further, as can be seen from Table 1 and FIG. 4, the deformation due to warpage of the light diffusion sheet is reduced in the case in which the coefficient $Y_2$ of static friction satisfies the relational expression (4) to the difference X in coefficient of linear expansion under high temperature conditions (temperature: 65° C., humidity: 95%) (i.e., Examples 1 to 13).

INDUSTRIAL APPLICABILITY

As can be seen from the foregoing description, the present invention is useful particularly as a backlight unit to be used in a liquid crystal display device.

DESCRIPTION OF REFERENCE CHARACTERS

1 Liquid Crystal Display Device
2 Liquid Crystal Display Panel
3 First Polarizing Plate
4 Second Polarizing Plate
5 Backlight Unit
6 TFT Substrate
7 CF Substrate
8 Liquid Crystal Layer
21 Light Guide Sheet (Optical Element)
22 Light Source
23 Light Diffusion Sheet
24 Prism Sheet
26 Reflection Sheet
35 Base Layer
36 Prism Projection
37 Base Layer
38 Light Diffusion Layer
39 Anti-Sticking Layer
40 Resin Bead

What is claimed is:

1. A backlight unit comprising an optical element and a light diffusion sheet provided on a surface of the optical element, wherein
the light diffusion sheet includes:
a base layer having a front surface side and a back side, and containing a colorless and transparent synthetic resin,
a light diffusion layer disposed on the front surface side of the base layer and containing a light diffusion material that contains particles diffusing light beams and a binder for the particles, and
an anti-sticking layer disposed on the back side of the base layer, and formed of an acrylic urethane-based resin by dispersing resin beads in a resin matrix,
assuming that a coefficient of static friction between the optical element and the light diffusion sheet measured at a temperature of 23° C. and a humidity of 50% in accordance with JIS K 7125 is $Y_1$, and
a difference in coefficient of linear expansion between the optical element and the light diffusion sheet measured in accordance with JIS K 7197 is X (in units of $\times 10^{-6}$/K), the following relational expression (1) is satisfied,

[Math. 1]

$$Y_1 \leq 1.00 \times 10^{-4} X^2 - 3.43 \times 10^{-2} X + 2.35 \qquad (1).$$

2. A backlight unit comprising an optical element and a light diffusion sheet provided on a surface of the optical element, wherein
the light diffusion sheet includes:
a base layer having a front surface side and a back side, and containing a colorless and transparent synthetic resin,
a light diffusion layer disposed on the front surface side of the base layer and containing a light diffusion material containing particles diffusing light beams and a binder for the particles, and
an anti-sticking layer disposed on the back side of the base layer and formed of an acrylic urethane-based resin by dispersing resin beads in a resin matrix,
assuming that a coefficient of static friction between the optical element and the light diffusion sheet measured at a temperature of 65° C. and a humidity of 95% in accordance with JIS K 7125 is $Y_2$, and
a difference in coefficient of linear expansion between the optical element and the light diffusion sheet measured in accordance with JIS K 7197 is X (in units of $\times 10^{-6}$/K), the following relational expression (2) is satisfied,

[Math. 2]

$$Y_2 \leq 9.00 \times 10^{-5} X^2 - 3.51 \times 10^{-2} X + 3.12 \qquad (2).$$

3. The backlight unit of claim 1, wherein the optical element is a light guide sheet.

4. A liquid crystal display device comprising:
a liquid crystal display panel;
a polarizing plate provided on a surface of the liquid crystal display panel; and
the backlight unit of claim 1 disposed to face the polarizing plate.

5. The backlight unit of claim 2, wherein the optical element is a light guide sheet.

6. A liquid crystal display device comprising:
a liquid crystal display panel;
a polarizing plate provided on a surface of the liquid crystal display panel; and
the backlight unit of claim 2 disposed to face the polarizing plate.

* * * * *

UNITED STATES PATENT AND TRADEMARK OFFICE
CERTIFICATE OF CORRECTION

PATENT NO. : 11,131,799 B2  Page 1 of 1
APPLICATION NO. : 16/957277
DATED : September 28, 2021
INVENTOR(S) : Namikawa et al.

It is certified that error appears in the above-identified patent and that said Letters Patent is hereby corrected as shown below:

In the Specification

In Columns 9-10, Table 1, Line 4 (Approx.), delete "$a_2$" and insert --$α_2$--.

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*